(12) United States Patent
Kerr

(10) Patent No.: US 8,169,625 B2
(45) Date of Patent: May 1, 2012

(54) HANDLING UNHANDLED RASTER OPERATIONS IN A DOCUMENT CONVERSION

(75) Inventor: Clifton Kerr, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 12/239,193

(22) Filed: Sep. 26, 2008

(65) Prior Publication Data

US 2010/0083094 A1     Apr. 1, 2010

(51) Int. Cl.
*G06F 15/00* (2006.01)
*G06K 9/32* (2006.01)
(52) U.S. Cl. .......................................... 358/1.1; 382/298
(58) Field of Classification Search .................... 358/1.1, 358/1.9, 1.13, 1.15, 534, 1.11, 1.16, 1.2, 358/2.1, 3.05, 3.13; 382/298, 100, 173, 254; 345/426, 418, 613, 629, 548
See application file for complete search history.

(56) References Cited

U.S. PATENT DOCUMENTS

| | | | |
|---|---|---|---|
| 6,765,695 B2 | 7/2004 | Chen et al. | |
| 7,345,782 B2 * | 3/2008 | Kumar | 358/1.16 |
| 2005/0246145 A1 * | 11/2005 | Zhu | 703/2 |
| 2005/0264582 A1 | 12/2005 | Merrill | |
| 2006/0290968 A1 | 12/2006 | Itoh | |
| 2007/0136659 A1 | 6/2007 | Adelberg et al. | |
| 2007/0159646 A1 | 7/2007 | Adelberg et al. | |
| 2007/0165267 A1 | 7/2007 | Fransazov | |
| 2008/0178067 A1 | 7/2008 | Lahman et al. | |

FOREIGN PATENT DOCUMENTS

WO    2007108547 A1    9/2007

OTHER PUBLICATIONS

"Maximum Performance from XPS Documents", Oct. 2, 2007, 12 pages. http://download.microsoft.com/download/9/c/5/9c5b2167-8017-4bae-9fde-d599bac8184a/MaxPerfXpsDocs.doc.
"How to Open, View or Create XPS Documents in Windows XP and Windows 2003", Jan. 27, 2007, 12 pages. http://www.mydigitallife.info/2007/01/27/how-to-open-view-or-create-xps-documents-in-windows-xp-and-windows-2003/.

* cited by examiner

*Primary Examiner* — Saeid Ebrahimi Dehkordy
(74) *Attorney, Agent, or Firm* — Alleman Hall McCoy Russell & Tuttle LLP

(57) ABSTRACT

The conversion of a document of a first format that supports a set of raster operations into a document of a second format that does not support one or more unhandled raster operations of the set of raster operations is disclosed. For example, one disclosed embodiment comprises locating a region in the document of the first format that contains an unhandled raster operation, rasterizing the region in the document of the first format that contains the unhandled raster operation to form a rasterized region, and incorporating the rasterized region into the document of the second format.

20 Claims, 5 Drawing Sheets

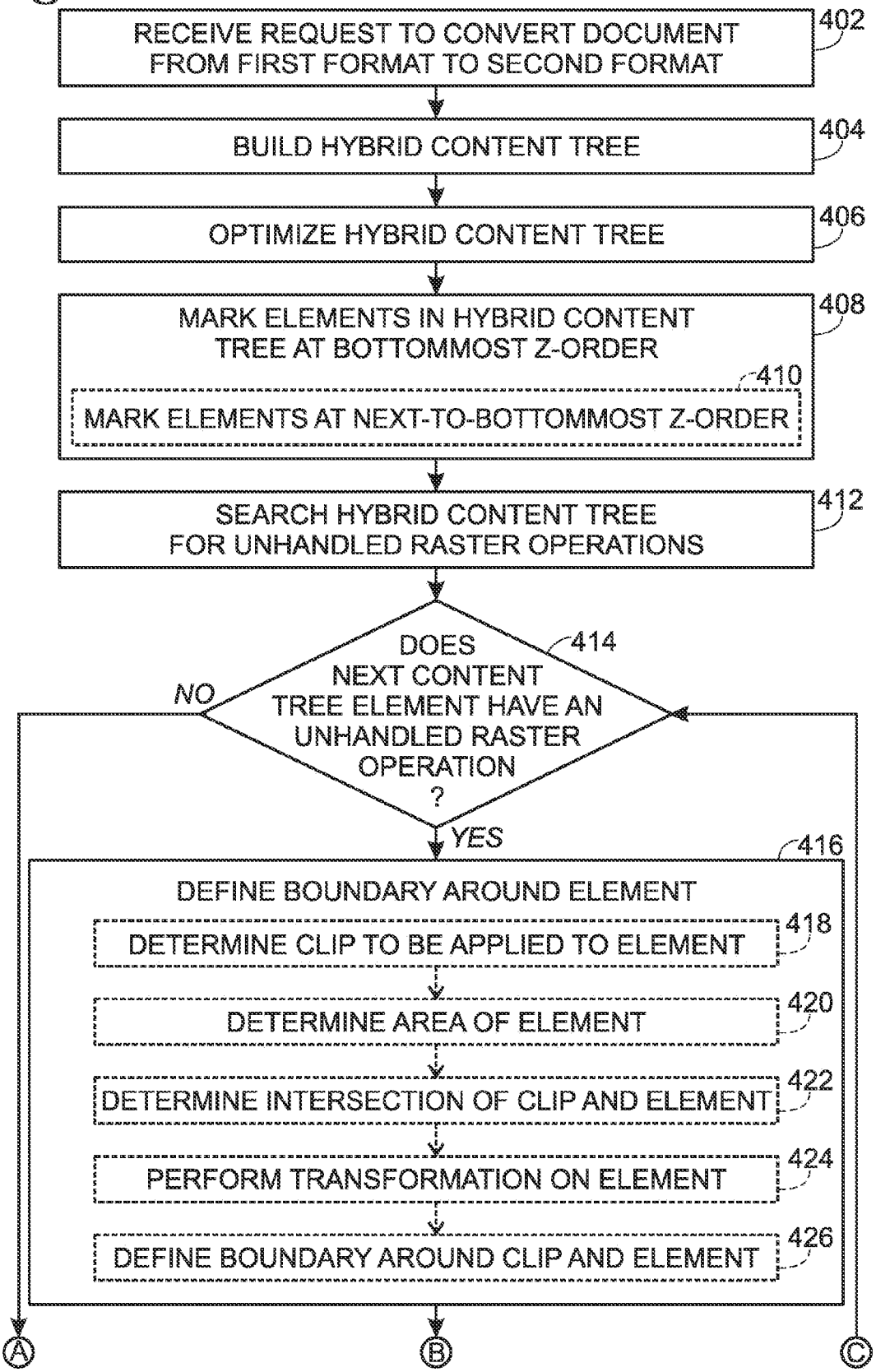

HANDLING UNHANDLED RASTER OPERATIONS IN A DOCUMENT CONVERSION

BACKGROUND

Raster operations, or ROPs, are binary bitwise operations, such as AND, OR, XOR, and NOT, that are performed on any combination of a destination (D), a source (S), and a pattern (P) object. ROPs are historically used to support transparency and masking in computer printing, screen display, and other graphical environments that do not otherwise support transparency and alpha channels. The use of ROPs may allow the illusion of transparency in a printed document to be achieved via the use of patterned masks.

More recent applications support transparency through other mechanisms than ROPs. Therefore, more modern print drivers, document viewers, and other such applications may not natively support ROPs. However, some applications, such as legacy applications, may still use ROPs. Therefore, the handling of ROPs in documents produced by such applications may present challenges for printer drivers and other such applications that do not natively support ROPs.

SUMMARY

Accordingly, various embodiments related to the handling of unhandled ROPs are disclosed. For example, one disclosed embodiment comprises a method of converting a document of a first format that supports a set of raster operations into a document of a second format that does not support one or more unhandled raster operations of the set of raster operations. The method comprises locating a region in the document of the first format that contains an unhandled raster operation, rasterizing the region in the document of the first format that contains the unhandled raster operation to form a rasterized region, and incorporating the rasterized region into the document of the second format.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
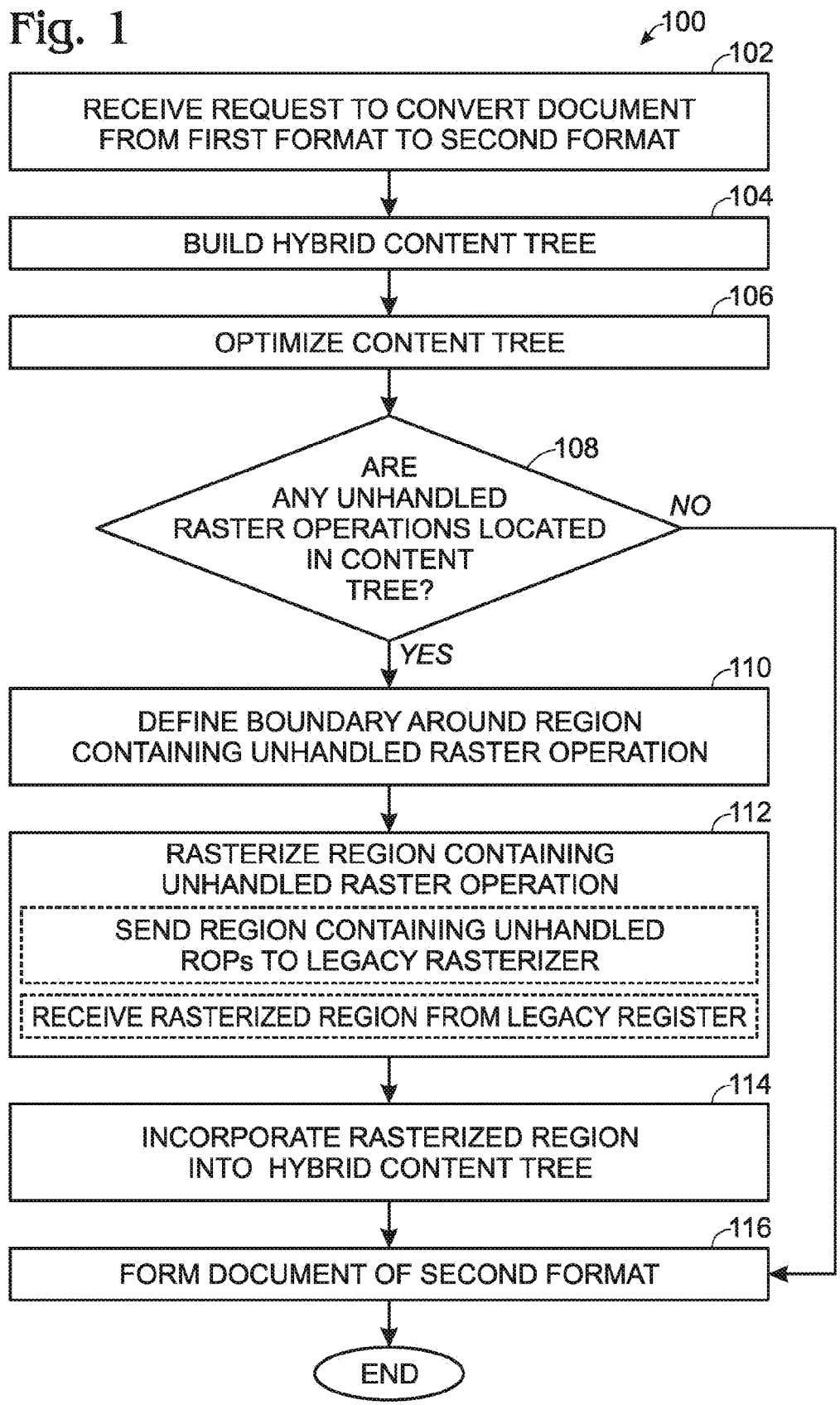
FIG. 1 shows an embodiment of a method of converting a document of a first format that supports raster operations to a document of a second format that does not support raster operations.

FIG. 1 shows an embodiment of a method 100 of converting a document from a first format that natively supports ROPs into a second format that does not natively support ROPs. The term "unhandled ROP" as used herein describes a ROP that is not natively supported by the second document format, and that is not handled by specialized targeted handling algorithms used by the second format to interpret specific ROPs. The term "document format" refers to any format for storing and/or printing an electronic version of a document. Method 100 first comprises, at 102, receiving a request to convert a document from a first format into a document of a second format. In one specific embodiment, this may be a request to convert a document from a format printable by a WINDOWS WIN32 printing architecture (available from the Microsoft Corporation of Redmond, Wash.), such as a .EMF (Enhanced Metadata File) file prepared by a WIN32 Graphics Device Interface (GDI) (also available from the Microsoft Corporation), into an XPS (XML Paper Specification) document. Such a request may originate, for example, from such a GDI, and may be received by a document converter that forms the document of the second format from Device Driver Interface (DDI) calls received from the GDI.

Continuing with FIG. 1, method 100 next comprises, at 104 building a hybrid content tree that comprises information in both the first document format and the second document format. The hybrid content tree may be built, for example, based upon calls received from a GDI, or in any other suitable manner.

Next, method 100 comprises, at 106, optimizing the hybrid content tree. This may include, for example, processes such as image stitching, rectangular gradient stitching, and glyphrun merging. Further, this also may include performing any specialized targeted handling algorithms used by the second format to interpret specific supported ROPs.

After optimization, method 100 next comprises, at 108, determining whether any unhandled ROPs exist in the hybrid content tree. This may comprise, for example, "walking the content tree" (i.e. examining each element of the hybrid content tree) to search for unhandled ROPs. If no unhandled ROPs are found, then method 100 comprises forming the document of the second format, as indicated at 116.

On the other hand, if an unhandled ROP is found in the hybrid content tree, then method 100 comprises, at 110, defining a boundary around a region containing the unhandled ROP. The boundary defined around the region containing the ROP may be determined in any suitable manner, and have any suitable geometry and size. Various more specific embodiments of defining a boundary around an unhandled ROP are discussed in detail below.

After defining a boundary around the region containing the unhandled ROP, method 100 next comprises, at 112, rasterizing the region containing the unhandled ROP to form an image of the region. In some embodiments, the region containing the unhandled ROP may be rasterized by making one or more DDI (device driver interface) calls to a legacy GDI (for example, the Graphics Rendering Engine (GRE) of the WIN32 printing architecture) to perform the rasterization, and then receiving from the GDI the rasterized image of the region containing the unhandled ROP. Likewise, in some embodiments, bands of the hybrid content tree are rasterized, and the rasterized regions are then extracted from the bands. More specific embodiments of the rasterization process are discussed in detail below.

After rasterizing the region containing the unhandled ROP, method 100 next comprises, at 114, incorporating the rasterized region into the hybrid document tree, and may also comprise deleting content from the hybrid content tree that is to be replaced by the rasterized region. Then, at 116, method 100 comprises forming the document of the second format from the hybrid content tree.

Method 100 allows any unhandled ROPs to be handled in a conversion of a document from the first format to the second format such that the documents will be rendered truly by a print driver, an application, etc. that utilizes the second format. Further, as mentioned above, method 100 may utilize a rasterizer of a legacy printing system to rasterize the region containing an unhandled ROP. This may help to simplify the design of a document format converter for converting documents of the first format to the second format, as the utilization of the legacy printing system rasterizer may allow a developer to avoid designing a dedicated rasterizer for the document converter.

In contrast, other potential methods of handling unhandled ROPs may be difficult to use with all unhandled ROPs. For example, configuring a document converter to natively support ROPs involves the reverse engineering of individual ROP patterns observed from specific applications, which may arrive over one or more (and sometimes many) device driver interface calls from the legacy printing architecture. The reverse engineering of such calls or groups of calls involves deducing the initial application's intent in using the ROPs, and then converting the ROPs into high-fidelity markups in the second document format. Given the potentially large number of ROPs that may be used by an application (up to 256 different ROP patterns), the fact that such ROPs may be called over one or more device driver interface calls, and the fact that such ROPs may act upon many different combinations of source, destination, and pattern objects, the reverse engineering of each ROP used by each application of interest may be an enormous, laborious task. Additionally, if an updated version of an application changes the ROP patterns it uses, the reverse engineering for that application may fail in the future. Further, such reverse engineering may introduce unforeseen regressions by incorporating unintended device driver interface calls into an application's presumed intent. This may cause the reversed engineered ROP support to generate incorrect output. Further, applications and developers in the future may use ROPs in unforeseen ways, which may cause a reverse engineering solution to be a continuous, ongoing task. Finally, there may be some ROPs that are exceedingly difficult, or impossible, to reverse engineer, as many ROP patters require a destination surface or bitmap. In this case, the only way to obtain a destination surface is to rasterize all of the primitives preceding the respective ROP pattern, which is equivalent to developing a dedicated rasterizer for the document converter.

Figure 2:
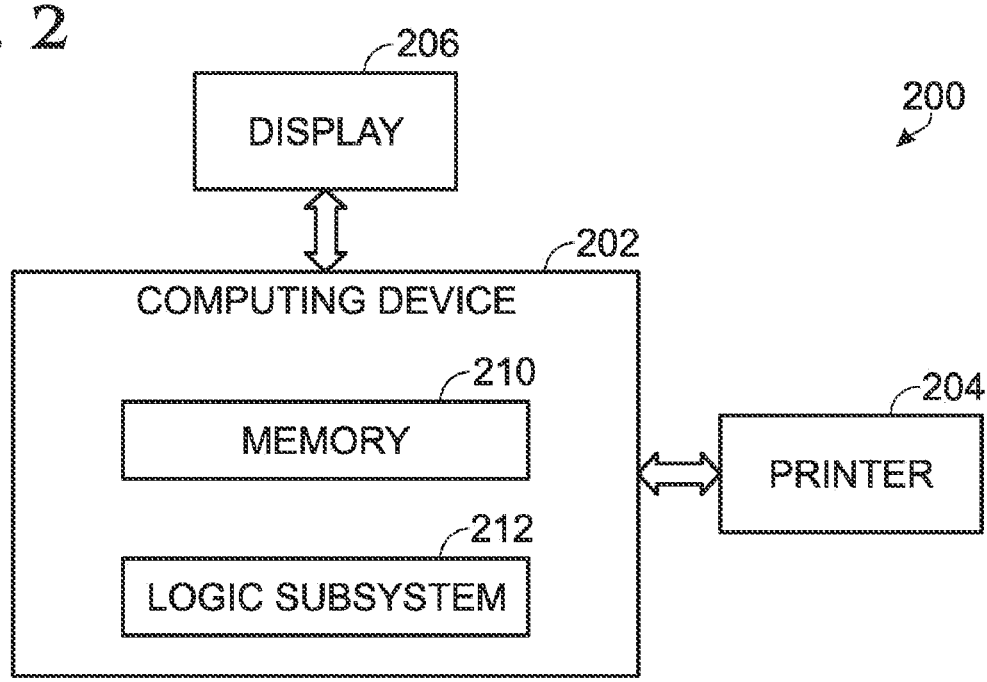
FIG. 2 shows an embodiment of an example computing device.
Figure 3:
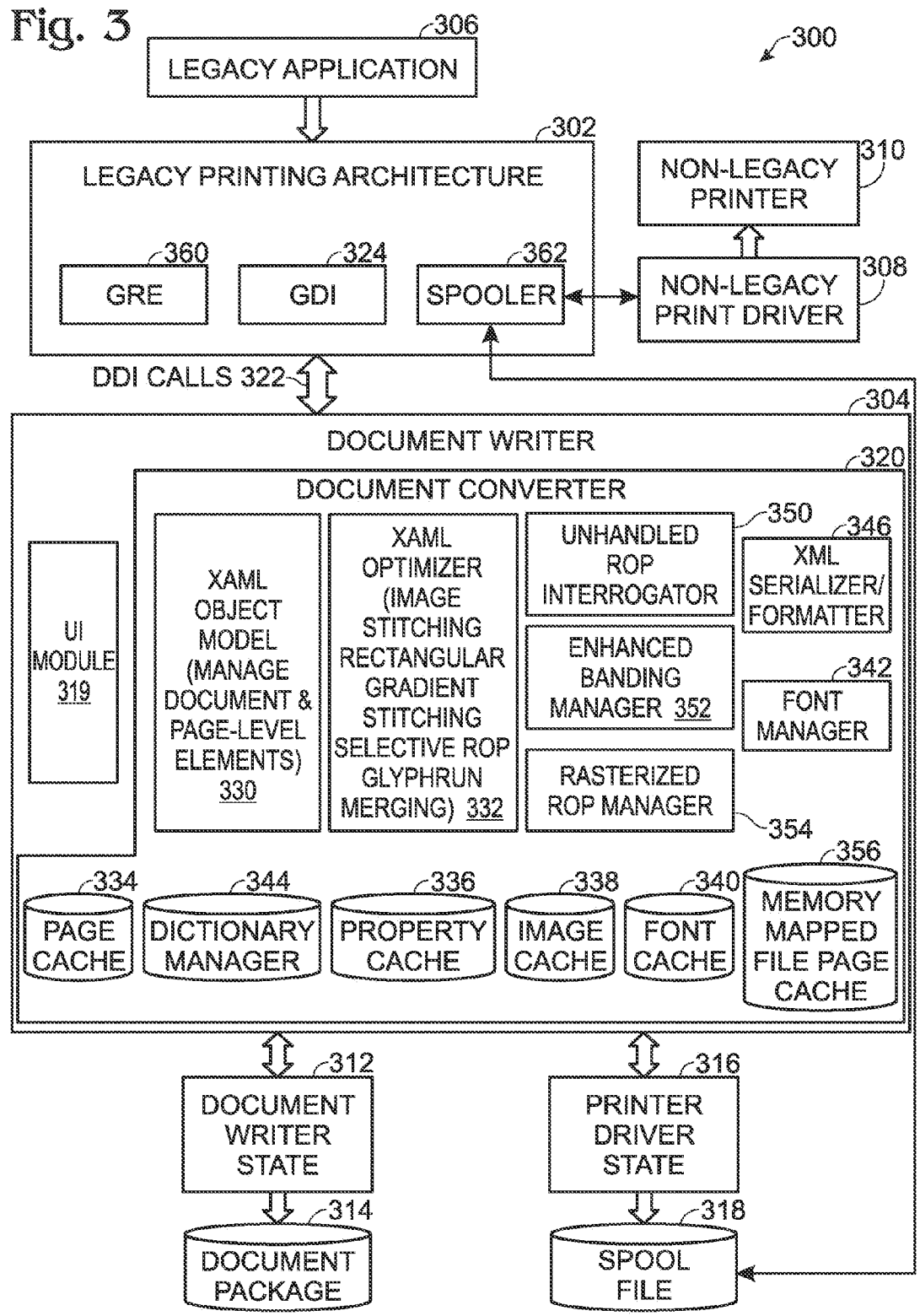
FIG. 3 shows an embodiment of an architecture of a document format conversion system on a computing device.

FIGS. 2 and 3 illustrate a system in which method 100 may be implemented. First referring to FIG. 2, a computing device environment 200 is shown. Computing device environment 200 comprises a computing device 202, a printing device 204, and a display 206. The computing device 202 comprises memory 210 and a logic subsystem 212 that comprises one or more processors, and/or any other suitable logic components. Memory 210 comprises instructions stored thereon that are executable by the logic subsystem 212 to perform the various methods disclosed herein. It will be understood that the term "computing device" may refer to any suitable type of computing device configured to execute programs. Such computing device may include, but are not limited to, a mainframe computer, personal computer, laptop computer, portable data assistant (PDA), computer-enabled wireless telephone, networked computing device, combinations of two or more thereof, etc. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

FIG. 3 shows an embodiment of a printing environment architecture 300 on computing device 200. Printing architecture 300 comprises a legacy printing architecture 302 and a document writer 304 in communication with the legacy printing architecture 302. The document writer 304 is configured to convert documents of a first format, which may be a format utilized by the legacy printing architecture 302, by a legacy application 306, etc., into a document of a second format that is utilized by a non-legacy program, a non-legacy print driver 308 and/or non-legacy printer 310, etc. The document writer 304 may be configured to operate in a document writer state 312, in which case an output of the document writer 304 is a document, illustrated as document package 314. In one specific embodiment, the document package 314 comprises a ZIP archive file that contains an XPS document. Likewise, the document writer 304 may be configured to operate in a printer driver state 316. When operating in this state, the document writer 304 may output a spool file 318. This spool file may then be printed via a spooler in the legacy printing architecture 302, as described below.

The document writer 304 comprises various components related to the conversion of a document of the first format to a document of the second format. For example, the document writer 304 comprises a user interface module 319 configured to present a user interface to a user of computing device 200. Upon a user request to convert a document to the second format, the user interface module 319 may request such inputs as a file name, a document or page orientation, whether to use compression and/or how much compression to use, etc.

The document writer 304 further comprises a document converter 320. The document converter 320 is configured to receive DDI calls 322 from a GDI 324 of the legacy printing architecture 302, and to use the DDI calls 322 to form a document of the second document format. The document converter 320 may comprise any suitable sub-systems and/or components for performing this function. For example, the document converter 320 comprises an object model, shown as XAML (Extensible Application Markup Language) object model 330, which comprises the hybrid document tree discussed above. Further, the document converter 320 comprises an XAML optimizer 332 configured to optimize a hybrid content tree after the tree is built. As described above, the optimizer may be configured to perform various functions, including but not limited to image stitching, glyphrun merging, vector path merging, and targeted ROP handling for ROPs that are handled via targeted heuristic-based reversed-engineered solutions.

The document converter 320 further comprises various caches. For example, the document converter 320 comprises a page cache 334 that stores a minimal amount of information to accurately describe each DDI call on a per-page basis. Further, a property cache 336 may be used to cache XAML properties such as clip and transparencies. An image cache 338 may be used to cache unique images per document, and a font cache 340 may be used to cache all unique fonts. The document converter 320 further comprises a font manager 342 for handling such tasks as font embedding and general font metrics, and a dictionary manger 344 for storing attributes such as path and data attributes that are used multiple times in a document. This allows a single copy of such attributes to be referenced at multiple places in a document, and therefore may allow a document file size to be reduced.

Additionally, an XML serializer/formatter 346 is included for serializing a document of the second format (XPS in this specific embodiment) after document conversion.

The document converter 320 further comprises various components for handling unhandled ROPs. These components include an unhandled ROP interrogator 350, an enhanced banding manager 352, a rasterized ROP manager 354, and a memory mapped file page cache 356.

The unhandled ROP interrogator 350 is configured to search the hybrid content tree in the object model 330 for unhandled ROPs, and to define boundaries around the unhandled ROPs in the content tree. Further, in some embodiments, the unhandled ROP interrogator 350 is configured to combine regions comprising any other elements that intersect or overlap the region containing the unhanded ROP ("region of interest"). In other embodiments, the unhandled ROP interrogator may be configured to combine any other regions with elements containing unhanded ROPs (as opposed to all elements) that overlap or intersect with the region of interest. By combining intersecting and/or overlapping elements or regions containing other unhandled ROPs with the region of interest, a single combined region may be rasterized and included in the document of the second format, rather than multiple smaller rasterized regions. This may help to avoid any visual effects caused by the overlap or intersection of the rasterized region with other elements in the document of the second format.

In some embodiments, only intersecting regions and overlapping regions with a lower "z-order" than the region containing the unhandled ROP are combined with the region containing the unhandled ROP for rasterization, while overlapping regions with a higher z-order are not combined. The term z-order is used herein to define a location of an element in the hybrid document tree in terms of a location or layer where the element is rendered along a Cartesian z-axis (i.e. normal to a computer monitor screen surface or printing medium surface) relative to other elements on the page. In other words, the Z order is the order of graphics primitives along the z-axis. When 2D graphics are rendered (rasterized), rendering is done with a "Painter's Algorithm". This may be analogized via a canvas on which a painter wishes to paint a scene. The painter may first paint the entire canvas white as a background color. This first layer would have a z-order of zero. Next, the painter may choose to paint a sky on a top half of a canvas with the color blue. This blue paint on the top half of the canvas would have a z-order of one because it overlaps with the initial white background. Next, the painter may choose to paint the bottom half of the canvas as land with the color brown. This bottom half also would have a z-order of one because it also overlaps with the initial white background. Next, if on the bottom left of the canvas, the painter chooses to paint some grass over the brown paint, the grass would have a z-order of two, as it overlaps the brown at the z=1 layer. In this manner, successive layers are added at successive z-orders.

As a specific example, if a region containing an unhandled ROP occupies z=4, 5 and 6 of a document with ten z-order layers, then overlapping regions at layers 1, 2 and 3 may be combined and rasterized, while overlapping regions at layers 7-10 may not be rasterized even if they overlap with the unhandled ROP region. In other embodiments, all overlapping or intersecting elements at any z-order, whether at a lower or higher z-order, may be combined with an unhandled ROP region.

Additionally, in some embodiments, the unhandled ROP interrogator 350 may be configured to mark elements at lower z-orders, and then not combine any marked elements that overlap or intersect the region containing the unhandled ROP. The marking of elements at lower z-orders by the unhandled ROP interrogator 350 may help to avoid the growth of the combined region where visual effects caused by overlap or intersection with other elements or unhandled ROP regions are likely to be obscured by higher z-order elements, and/or where the intersecting or overlapping elements are likely to have a single color that occupies a substantial portion of a page, such as background colors that often appear at low z-order layers. In some embodiments, elements at a bottom-most z-order only are marked, while in other embodiments, elements at other z-orders (e.g. second bottommost, third bottommost, etc.) may be marked as well.

The unhandled ROP interrogator 350 may be configured to define a boundary around a region containing an unhandled ROP in any suitable manner. For example, in one embodiment, the unhandled ROP interrogator 350 walks the hybrid content tree looking for the following conditions. First, the unhandled ROP interrogator 350 looks for successive graphics with overlapping ROPs forming a single graphics primitive. This is because a graphics primitive on a page may comprise more than one DDI call with ROP patterns. These calls comprise overlapping graphics primitives with overlapping boundaries. In this case, the unhandled ROP interrogator 350 will group these elements in the hybrid content tree, and perform a union of the boundaries. The determination of boundaries is described in more detail below.

Next, the unhandled ROP interrogator 350 also identifies unhandled ROPs requiring or not requiring a destination surface. If an element in the hybrid content tree contains an unhandled ROP, then all overlapping and intersecting elements beneath and above that element are grouped together in a single region for rasterization. If the boundaries of any primitives (lower or higher level) are larger than the current boundary, then the hybrid content tree is re-interrogated using the larger boundary. This process may continue to loop until all appropriate regions are captured in the boundary. In many cases, the boundary may surround a small, discrete region in a document page. Occasionally, the boundary may surround the entire page.

Next, some path elements (i.e. vector graphics elements) in the hybrid document may be tagged for placement in a resource dictionary as a normalized path with a first coordinate normalized to (0,0). Therefore, the unhandled ROP interrogator 350 may account for the re-transformation of these elements. Further, some elements, such as text and image elements, may have a transformed coordinate space. Therefore, the unhandled ROP interrogator 350 may transform the boundary for these elements to the correct space for appropriate rasterization.

The boundary around regions containing unhandled ROPs may be defined in any suitable manner. For example, in some embodiments, a rectangular box is defined around the element containing the unhandled ROP. In other embodiments, boundaries of other shapes, including other polygonal shapes, as well as polycurve shapes and/or combinations thereof, may be used.

In some embodiments, the process by which the boundary is defined may differ depending upon the type of element that contains the unhandled ROP. For example, some document formats, such as the XPS format, may comprise multiple types of elements, including path elements (vector graphics), glyph elements (characters), and image elements. Boundaries for each of these types of elements may be determined via different processes, or via similar processes. Examples of methods that the unhandled ROP interrogator 350 may use to define boundaries around each of these elements are as follows.

First regarding path elements, the boundary may be determined, for example, by first determining a boundary of a "clip" associated with the path element on a document page, where the clip specifies a size and shape of a region in the document in which the path element is to be included. Next, a boundary of the path coordinates is determined. These may be determined, for example, by determining a minimum x, minimum y, maximum x, and maximum y for the element, and then drawing a rectangular boundary (or other shape) based upon these values. Next, any appropriate transformations to convert or scale the paths from DDI space to XPS (or other suitable document format) space are applied. Then, an intersection of the boundary of the clip and the boundary of path coordinates is used as the boundary for the region containing the unhandled ROP. Further, a stroke width and/or miter size for the boundary may be determined where appropriate, for example, by obtaining a maximum of ½ of the stroke width or miter extension. It will be understood that this specific example is described for the purpose of illustration, and is not intended to be limiting in any manner.

In some document formats, a hierarchical arrangement of elements above an element containing an unhandled ROP may have multiple clips that are to be considered when determining the clip to apply to the element with the unhandled ROP. In this situation, the clip to apply to the element with the unhandled ROP may be determined by 1) determining the boundary of each clip object in the hierarchical tree; 2) applying the respective transformation to each clip's boundary; and 3) performing a union of all of the clips' boundaries.

Next regarding text elements comprising unhandled ROPs, in one embodiment, the unhandled ROP interrogator 350 obtains a boundary for text elements from the GDI 324 via DDI calls 322. The coordinates that define the boundary may be converted or scaled to an appropriate resolution for the document of the second format. Next, a clip of the boundary is obtained in the hybrid document tree, and the intersection of the clip boundary and the text boundary is used as a boundary around the region that contains the unhandled ROP. Further, any coordinate transforms or other transforms to the text element or the clip are also applied during this process. This may be accomplished, for example, by multiplying the respective matrices in the hierarchy of the element containing the unhandled ROP according to matrix multiplication rules.

Next regarding images, the unhandled ROP interrogator 350 may determine a boundary around an image element comprising an unhandled ROP as follows. First, a boundary of the destination of the image and a boundary of a clip applied to the image are determined from DDI calls 322 and from the hybrid content tree, respectively, with any appropriate scaling applied to the coordinates from the DDI calls 322. Next, an intersection of the clip and the image destination boundary is used as the boundary around the image element that comprises the unhandled ROP. Further, any coordinate transforms to the image and/or the clip may be applied during this process, as described above. It will be understood that these examples of processes for determining a boundary of a region containing an unhandled ROP are described for the purpose of example, and that any other suitable method may be used for any suitable document conversion process.

As described above, the unhandled ROP interrogator 350 may be configured to either (1) combine overlapping or intersecting regions that each have unhandled ROPs, or (2) combine a region having an unhandled ROP with any elements that intersect or overlap that region. Further, in more specific embodiments, the unhandled ROP interrogator 350 may be configured to mark elements at one or more lower z-orders, and then not to combine the boundaries of those marked elements with the boundaries of overlapping or intersecting unhandled ROP regions to form a combined region for rasterization.

In these embodiments, the combined regions may be formed in any suitable manner. For example, once a boundary around an unhandled ROP is defined, as described above, the coordinates of the boundary may be stored in a data structure. Then, the unhandled ROP interrogator 350 may continue to walk the hybrid content tree to search for overlapping elements or overlapping unhandled ROP regions, as defined by the boundary boxes around those elements or regions. If an overlapping element or overlapping unhandled ROP region is found, and the element or region is not marked as being in a low z-order, then the boundary in the data structure is expanded to incorporate both the original boundary and the boundary of the overlapping or intersecting element. In this way, the boundary around the unhandled ROP region may grow in a cascading manner until the end of the hybrid content tree is reached. Once the unhandled ROP interrogation is complete, the data structure that contains information regarding the unhandled ROP regions may contain coordinates that define zero or more unhandled ROP regions, depending upon how many unhandled ROPs the hybrid content tree contained and whether any overlap existed between unhandled ROP regions.

Continuing with FIG. 3, once the unhandled ROP interrogator 350 completes the data structure defining unhandled ROP regions in a page of a document, the data structure may be passed to the enhanced banding manager 352. The enhanced banding manager 352 determines any bands of the document page that are to be rasterized so that rasterized versions of the unhandled ROP regions may be obtained. In some embodiments, the enhanced banding manager bands only those portions of a document page that contain information within an unhandled ROP region as defined by the data structure. In this manner, the document converter 320 may avoid rasterizing the entire document page, thereby preserving computing resources.

After the enhanced banding manager 352 determines the bands of the document page that are to be rasterized, the document converter 320 passes those portions of the document to the legacy printing architecture 302 via DDI calls 322. The legacy architecture then may use a legacy graphics rasterizing engine (GRE) 360 to rasterize the bands. After the bands are rasterized, they are sent to the document converter 320 via DDI calls 322. The uncompressed bands are stored in the memory mapped file page cache 356. The use of a memory mapped file cache 356 helps to accommodate the possibility of an entire document page being rasterized and stored, as memory mapped files may facilitate the handling of large amounts of data that may not naturally fit within physical memory. In other embodiments, other suitable file formats may be used in place of or in addition to the memory mapped file page cache 356 for storing the rasterized bands.

Next, the rasterized ROP manager 354 replaces all of the unhandled ROP regions in the hybrid document tree. The rasterized ROP manager 354 may accomplish this task in any suitable manner. For example, the rasterized ROP manager may extract rectangular (or other suitably shaped) regions from the rasterized bands stored in the memory mapped file page cache 356, and insert the rasterized regions into the hybrid document tree. It also may delete any content from the hybrid content tree that is to be replaced by the rasterized regions. Once this replacement process is complete, serializer 346 may serialize the hybrid content tree to form the document of the second format, either as a document package 314 or as a spool file 318. Further, where the document is formed as a spool file 318, a spooler 362 in the legacy printing architecture 302 may be used to spool the file to a non-legacy print driver 308 and printer 310. It will be understood that the specific architecture embodiment is described in FIG. 3 for the purpose of example, and is not intended to be limiting in any manner.

Figure 4B:
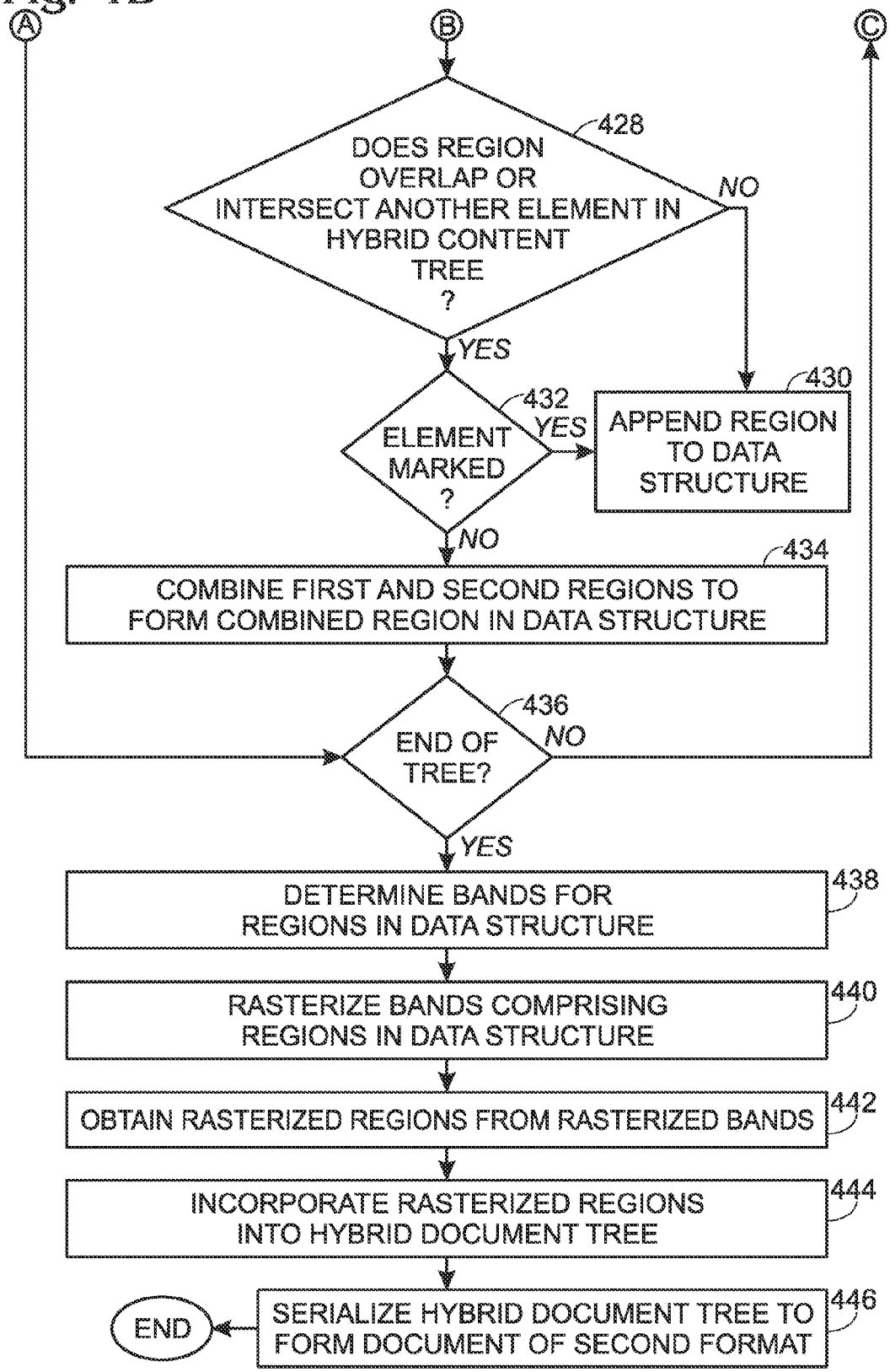
FIG. 4 shows another embodiment of a method of converting a document of a first format that supports raster operations to a document of a second format that does not support raster operations.

FIG. 4 shows another embodiment of a method 400 of handling unhandled ROPs in a conversion of a document from a first document format to a second document format. Method 400 comprises, at 402, receiving a request to convert a document from a first format to a second format. This may occur, for example, via a DDI call from a legacy printing architecture. Upon receipt of this request, a hybrid content tree is built, at 404, from DDI calls received from the legacy printing architecture, and the content tree is optimized, as described in more detail above.

After optimization of the hybrid content tree, method 400 comprises, at 408, marking elements in the hybrid content tree at a bottommost z-order. Further, in some embodiments, elements at a next-to-bottommost z-order are also marked, as indicated at 410. In yet other embodiments, elements at one or more higher z-orders may also be marked. After marking the bottommost z-order (and potentially other lower z-order) elements in the hybrid content tree, method 400 comprises, at 412, searching the hybrid content tree for elements with unhandled ROPs. If an element does not contain an unhandled ROP, as indicated at decision box 414, then method 400 determines, at 436, whether the element is a last element in the tree. If not, method 400 loops back to look at a next element in the hybrid content tree. This loop continues until an element comprising an unhandled ROP is found.

Once an element comprising an unhandled raster operation is found, a boundary is defined around the element, as described in detail above. This may comprise, for example, determining, at 418, a clip to be applied to the element; determining, at 420, an area occupied by the element (e.g. a boundary of the element); determining, at 422, an intersection of the clip and element boundary; performing, at 424, any appropriate coordinate transforms or other transforms on the clip and/or element boundaries; and defining, at 426, a boundary that encompasses the intersection of the clip and the element.

Next, method 400 comprises determining, at 428, whether the region defined by the boundary overlaps or intersects any elements in the hybrid content tree (or, in some embodiments, a second region with an unhandled ROP). This may comprise, for example, comparing the boundary of the region to data within a data structure used for tracking unhandled ROP regions. If no such overlap exists (for example, if no other regions are in data structure, or if regions in data structure do not overlap), coordinates that define the region are appended, at 430, to the unhandled ROP data structure. On the other hand, if it is determined that such intersection or overlap exists, then it is determined, at 432, if the overlapping or intersecting element is marked as being a lower z-order element. If the element is marked, then coordinates defining the second region with the unhandled ROP are appended to the data structure. On the other hand, if the element is not marked, then the boundary of the overlapping or intersecting element is combined in the data structure with the boundary around the region containing the unhandled ROP, thereby forming a combined region in the data structure.

Method 400 continues to loop in this manner until the entire hybrid content tree has been interrogated. Once the end of the tree has been reached, bands for rasterizing are determined, at 438, and the bands are rasterized, at 440, to form rasterized bands. The rasterization of bands may help to more efficiently manage memory in the storage of the rasterized images. As described above, the rasterizing may be performed by a legacy rasterizer in a legacy printing architecture, or may be performed in any other suitable manner. Likewise, the rasterized bands may be stored in a memory mapped file cache, or in any other suitable type of cache.

After rasterizing the bands, rasterized regions corresponding to the regions in the data structure are obtained from the rasterized bands, at 442, and incorporated into the hybrid document tree, at 444. Further, any content in the hybrid document tree to be replaced with rasterized regions may be deleted from the hybrid document tree. Once all rasterized regions have been incorporated into the hybrid document tree, the hybrid document tree is serialized, at 446, to form the document of the second format. It will be noted that, in some embodiments, method 400 may be performed on a page-by-page basis. Therefore, for multi-page documents, method 400 may be performed separately for each page of the document.

While the rasterization of unhandled ROPs is disclosed herein in the context of specific example embodiments, it will be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a document format converter on a computing device, a method of converting a document of a first format that supports a set of raster operations into a document of a second format that does not support one or more unhandled raster operations of the set of raster operations, the method comprising:
   locating a region in the document of the first format that contains an unhandled raster operation;
   rasterizing the region in the document of the first format that contains the unhandled raster operation to form a rasterized region while not rasterizing another region in the document of the first format; and
   incorporating the rasterized region and the other region into the document of the second format.

2. The method of claim 1, wherein locating a region in the document of the first format that contains an unhandled raster operation comprises locating an unhandled raster operation, and defining a boundary around the unhandled raster operation.

3. The method of claim 2, wherein defining a boundary comprises defining a rectangular boundary that encloses the region in the document of the first format that comprises the unhandled raster operation.

4. The method of claim 2, wherein defining a boundary comprises defining one or more of a polygonal boundary or a polycurve boundary that encloses the region in the document of the first format that comprises the unhandled raster operation.

5. The method of claim 2, wherein locating a region in the document of the first format that contains an unhandled raster operation comprises forming a hybrid document content tree, and locating the unhandled raster operation in the hybrid document content tree.

6. The method of claim 5, further comprising performing one or more transforms on an element in the hybrid document content tree that contains the unhandled raster operation before defining the boundary around the unhandled raster operation.

7. The method of claim 6, further comprising determining a region of overlap between a clip and the region in the document of the first format that contains an unhandled raster operation, and defining the boundary around the region of overlap.

8. The method of claim 1, wherein the region in the document of the first format that contains the unhandled raster operation is a first region, and further comprising:
    locating a second region in the document of the first format that contains an element with a boundary that overlaps the boundary of the first region, the second region being different than the other region that is not rasterized,
    determining whether the first region and the second region overlap,
    combining the first region and second region into a combined region if the first region and the second region are determined to overlap,
    rasterizing the combined region to form a rasterized combined region, and
    incorporating the rasterized combined region into the document of the second format.

9. The method of claim 8, further comprising, before determining whether the first region and the second region overlap, forming a hybrid document tree, marking elements in the hybrid document tree that are at a bottommost z-order, and combining the first region and the second region only if elements in the hybrid document tree containing the first region and the second region are marked as being at the bottommost z-order.

10. The method of claim 1, further comprising deleting elements in the document of the second format that are located within the rasterized region.

11. The method of claim 1, wherein rasterizing the region in the document of the first format comprises sending a device driver interface call to a graphics rendering engine, and receiving the rasterized region from the graphics rendering engine via a device driver interface call.

12. The method of claim 1, wherein rasterizing the region in the document of the first format comprises rasterizing a band of the document of the first format to form a rasterized band that comprises the rasterized region, and then extracting the rasterized region from the rasterized band.

13. In a document format converter on a computing device, a method of converting a document of a first format that supports a set of raster operations into a document of a second format that does not support one or more unhandled raster operations of the set of raster operations, the method comprising:
    locating a first region in the document of the first format that contains a first unhandled raster operation;
    locating a second region in the document of the first format that contains an element that intersects or overlaps with the first region in the document of the first format;
    forming a combined region that comprises both the first raster operation and the element that intersects or overlaps with the first region;
    rasterizing the combined region to form a rasterized combined region; and
    incorporating the rasterized combined region into the document of the second format.

14. The method of claim 13, wherein the second region comprises a second unhandled raster operation.

15. The method of claim 13, wherein locating the first region and the second region comprises forming a hybrid document content tree and locating the first unhandled raster operation and second unhandled raster operation in the hybrid document content tree, and wherein the method further comprises, before the locating the first region and the second region, marking one or more bottommost z-order elements in the hybrid document content tree.

16. The method of claim 15, further comprising marking elements at a next-to-bottommost z-order.

17. The method of claim 15, further comprising forming the combined region only if the first unhandled raster operation and the second unhandled raster operation are not associated with elements in the hybrid document content tree that are marked.

18. The method of claim 13, wherein rasterizing the combined region comprises rasterizing a band of the document of the first format to form a rasterized band that comprises the rasterized combined region, and then extracting the rasterized combined region from the rasterized band.

19. In a document format converter on a computing device, a method of converting a document of a first format that supports a set of raster operations into a document of a second format that does not support one or more unhandled raster operations of the set of raster operations, the method comprising:
    forming a hybrid document content tree for the conversion of the document in the first document format to the document of the second document format;
    marking elements at a bottommost z-order in the hybrid document content tree;
    locating a first unhandled raster operation in the hybrid document content tree;
    defining a boundary around a first region containing the first unhandled raster operation;
    locating an element that overlaps the first unhandled raster operation in the hybrid document content tree;
    defining a boundary around the element;
    determining whether the element is marked as a bottommost z-order element;
    if element is marked as a bottommost z-order element, then forming a combined region that comprises both the first region and the boundary around the element;
    rasterizing the combined region to form a rasterized combined region; and
    incorporating the rasterized combined region into the document of the second format.

20. The method of claim 19, further comprising not forming the combined region if the element is marked as a bottommost z-order element.

* * * * *